United States Patent [19]
Rich

[11] Patent Number: 5,894,864
[45] Date of Patent: Apr. 20, 1999

[54] REPAIR OR MAINTENANCE SYSTEM FOR LEAKING PIPES OR PIPE JOINTS

[76] Inventor: Benjamin P. Rich, 113 Royal Pine Cir. North, Royal Palm Beach, Fla. 33411

[21] Appl. No.: 08/687,260

[22] Filed: Jul. 25, 1996

Related U.S. Application Data

[60] Provisional application No. 60/001,532, Jul. 26, 1995.

[51] Int. Cl.$^6$ .................................................. F16L 55/168
[52] U.S. Cl. .................................................. 138/99; 138/97
[58] Field of Search .......................... 138/97, 99; 285/15

[56] References Cited

U.S. PATENT DOCUMENTS

| | | | |
|---|---|---|---|
| 2,924,546 | 2/1960 | Shaw | 138/99 |
| 3,790,418 | 2/1974 | Huvey et al. | 138/97 |
| 4,357,961 | 11/1982 | Chick | 285/15 |
| 4,519,856 | 5/1985 | Lazzara | 138/99 |
| 4,552,183 | 11/1985 | Chick | 138/99 |
| 4,756,337 | 7/1988 | Settineri | 138/99 |
| 5,030,493 | 7/1991 | Rich | 138/99 |
| 5,139,840 | 8/1992 | Ferrara | 428/78 |
| 5,643,648 | 7/1997 | Kobe et al. | 428/63 |

FOREIGN PATENT DOCUMENTS

| | | |
|---|---|---|
| 0 724 111 A1 | 7/1996 | European Pat. Off. . |
| 0596190 | 11/1925 | France .................. 138/99 |

*Primary Examiner*—Denise L. Ferensic
*Assistant Examiner*—James F. Hook
*Attorney, Agent, or Firm*—Arnold, White & Durkee

[57] ABSTRACT

A method of repairing and maintaining a pipe or pipe joint comprises applying a plurality of components to form a cooperative combination that strengthens, seals and protects the pipe or pipe joint. The initial components of the system seal, repair and/or protect the underlying structure, and the final component of the system binds the initial components to the underlying structure forms a strong cover strengthening and protecting the pipe and/or pole.

5 Claims, 6 Drawing Sheets

REPAIR OR MAINTENANCE SYSTEM FOR LEAKING PIPES OR PIPE JOINTS

CROSS REFERENCE TO RELATED APPLICATIONS

This application claims priority from U.S. Provisional Patent Application Ser. No. 60/001,532, filed Jul. 26, 1995, for "Wrappable Structural Repair Method and System".

FIELD OF THE INVENTION

The present invention relates, in general, to methods of and means for on-site repair and maintenance of industrial and commercial structures, such as pipes and pipe joints carrying liquids under pressure, and pipes carrying liquids not under pressure. More specifically, the present invention employs a system or combination of components which can be wrapped around the structures to seal, strengthen, and/or protect the structure.

BACKGROUND OF THE INVENTION

Commercial and industrial structures that are exposed to water or other liquids may become damaged or worn requiring on-site replacement, repair or maintenance. Replacement of a structure such as a pipe carrying a liquid under pressure is relatively complex, costly and time consuming. The more desired option is to repair and maintain the structure. The repair and maintenance of the structure is often complicated and time consuming, such as requiring the removal of pressure in a pipe or waiting for an adhesive to set. Additionally, the repaired area is often more susceptible to deterioration and further wear and damage than the rest of the structure.

SUMMARY OF THE INVENTION

It is a primary objective of the present invention to provide an improved method and system of repair and maintenance of fluid conduits such as pipes and pipe joints, which is relatively simple and quick and which seals, strengthens, and/or protects the structure.

Another important object of this invention is to provide an improved method and system of repair and maintenance of a leaking pipe carrying a liquid under pressure which is relatively simple and quick and which seals, strengthens, and protects the pipe.

Still another object of this invention is to provide an improved method and system of repair and maintenance of a leaking pipe carrying a liquid not under pressure which is relatively simple and non-time consuming and which seals, strengthens, and protects the pipe.

Another object of this invention is to provide an improved method and system of repair and maintenance of a leaking pipe joint carrying a liquid under pressure which is relatively simple and quick and which seals, strengthens, and protects the pipe joint.

In accordance of the present invention, the foregoing objective of repairing or maintaining a pipe carrying a liquid under pressure is realized by applying a first component to the pipe to at least partially seal the leak, and then wrapping a second component over the first component to form a cover which seals, strengthens and protects the pipe. The first component may be in the form of a patch applied to the pipe to at least partially seal the leak, or it may be a material that is wrapped around the leaking portion of the pipe or joint to stop the liquid from escaping. If desired, an intermediate component may be wrapped over the first component to complete the sealing of the leak and/or to urge the first component firmly into the leaking opening.

In a preferred embodiment, the first component is a strip or patch of butyl rubber, and the second component is a mastic-impregnated fabric strip. In one specific version, the strip of butyl rubber used as the first component is an elongated band that is wound around the leaking pipe, directly over the leak. In another specific version, the first component is a discrete patch or strip that is adhesively applied to the pipe directly over the leak, and then an intermediate component in the form of an elastic band is wrapped around the pipe and directly over the first component. The elastic band is preferably attached directly to the pipe by adhesive-tape tabs at both ends of the elastic band.

In another preferred embodiment, a leaking pipe joint is repaired by wrapping a butyl rubber strip around the pipe at the leaking end of the joint, and then an intermediate member in the form of an elastic band is wrapped around the pipe and the leaking end of the joint, over the butyl rubber strip. The elastic band is preferably attached directly to the pipe by adhesive-tape tabs at both ends of the elastic band.

BRIEF DESCRIPTION OF THE DRAWINGS

The foregoing and other advantages of the invention will become apparent upon reading the following detailed description and upon reference to the drawings in which.

DETAILED DESCRIPTION OF THE PREFERRED EMBODIMENT

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

In general the method of this invention comprises applying to the structure being repaired or maintained a plurality of components which form a cooperative combination that seals, strengthens, and protects the underlying structure. The initial components of the system of the invention may be chosen from among a wide range of flexible protective materials, some having physical strength properties, while others are chosen primarily for their ability to seal, repair and/or protect the underlying structure. The final component of the system is preferably chosen for its ability to bind the initial components to the underlying structure and to form a strong cover strengthening and protecting the structure. Ideally, the final component may be composed of a flexible web impregnated with a pliable mastic which readily adheres to surfaces of articles and which hardens in the presence of moisture. Specific examples of such materials are described in U.S. Pat. Nos. 4,519,856 and 5,030,493, which are owned by the assignee of the present invention, who makes and sells such components under the trademark "SYNTHO-GLASS". The disclosures of those patents are incorporated by reference into the present disclosure.

Figure 1:
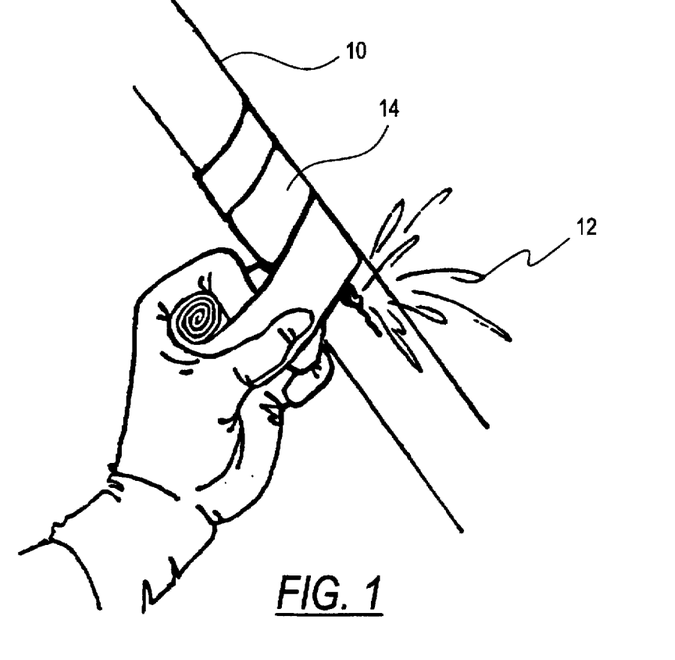
FIG. 1 illustrates a leaking pipe carrying a liquid under pressure being wrapped with a first component of the system of the invention.
Figure 2:
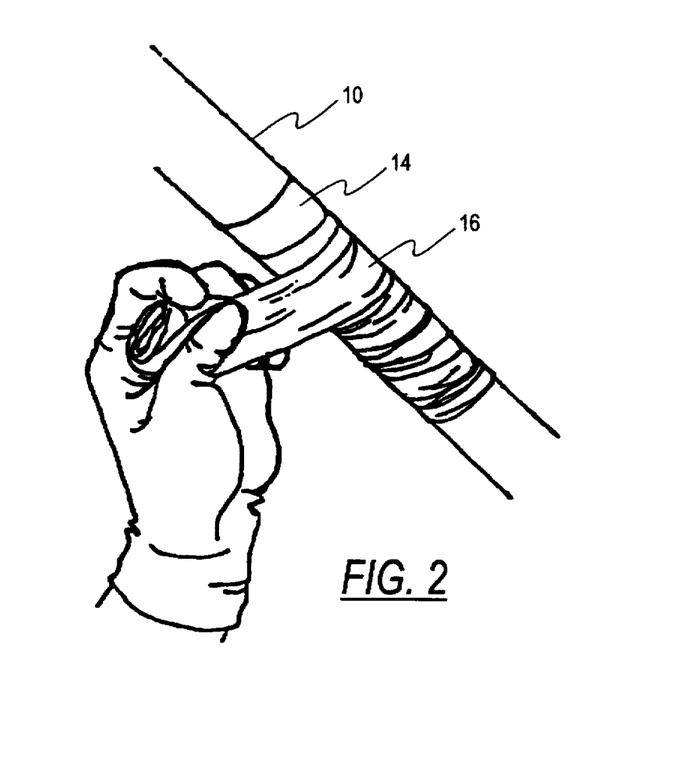
FIG. 2 illustrates a second component of the system being wrapped over the first component shown in FIG. 1, to form a cooperative combination of the two components of the system.

Referring now to FIGS. 1 and 2, a pipe 10 carrying a liquid under pressure has sprung a leak through which liquid 12 is escaping. FIG. 1 shows the first step of the method of the invention; a first component 14 of the system in the form of an elastic band of high-tensile-strength rubber is wrapped around the pipe 10 over the leak while the liquid 12 in the pipe 10 is under pressure. This band 14 may be about 1.5 inches wide and 1/16 inch thick, and long enough to start wrapping approximately two inches from one side of the leak and wrap in one direction to the same distance on the other side of the leak, and back again, to form two or more tight layers sufficient to stop the leak. The band 14 should be wrapped quickly and tightly stretched with sufficient overlap to form a seal. It is preferred to select a length of band 14 such that the entire length will be used to wrap the pipe 10, so that when the first component 14 has been wrapped to stop the leak, a second component 16 can be applied over it (FIG. 2) with minimum delay One suitable material is the "ORISTAPE" brand tape available from Oristape Manufacturing Company, Tokyo, Japan.

About a six-inch length of adhesive-coated rubber or plastic tape is attached to each end of the band 14 to hold the band securely in place on the pipe. The elastic band 14 is stretched as it is wound around the pipe 10 so that the wrapped band firmly engages the pipe surface, thereby sealing the leak in the pipe. The tape on one end of the band 14 is attached to the surface of the pipe 10 at the beginning of the wrapping operation to anchor the band to the pipe, and the tape at the other end of the band 14 is attached to the pipe at the end of the wrapping operation to hold the band in its stretched and wrapped condition on the pipe surface The second step of the method, shown in FIG. 2, preferably follows without delay, to form a substantially rigid cover fitted tightly over the first component 14. The second component 16, applied in the second step, provides mechanical protection for the band 14 and also prevents the band 14 from unwinding. The second component 16 should be wrapped over a distance extending about two inches to either side of the band 14. "SYNTHO-GLASS", the product identified above, is the preferred second component 16, which after being wrapped around the first component 14 will harden in the presence of moisture. Thus, if water was leaking from the pipe 10 the second component 16 may benefit from it; otherwise, water is applied to the "SYNTHO-GLASS".

Figure 3:
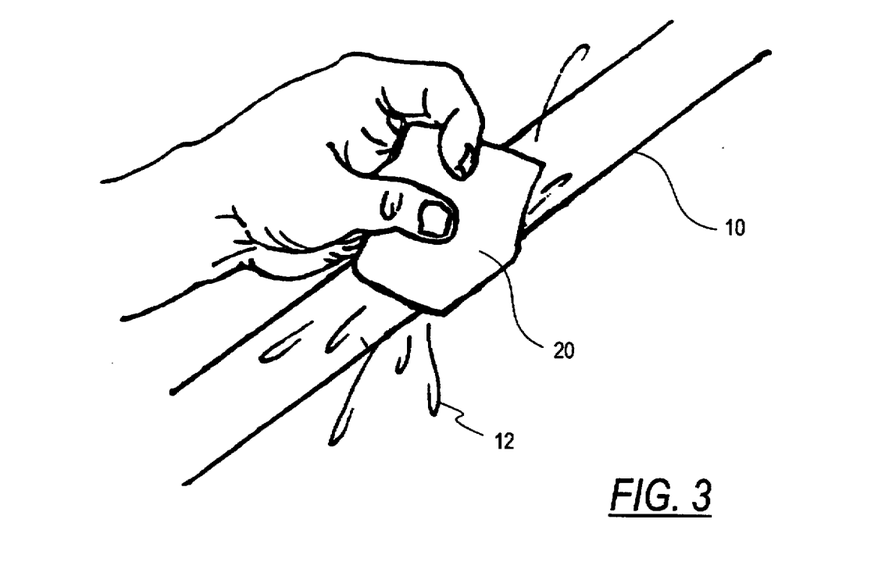
FIG. 3 illustrates a leaking pipe carrying a liquid which is not under pressure to which a first component in the form of a patch is being applied.
Figure 4:
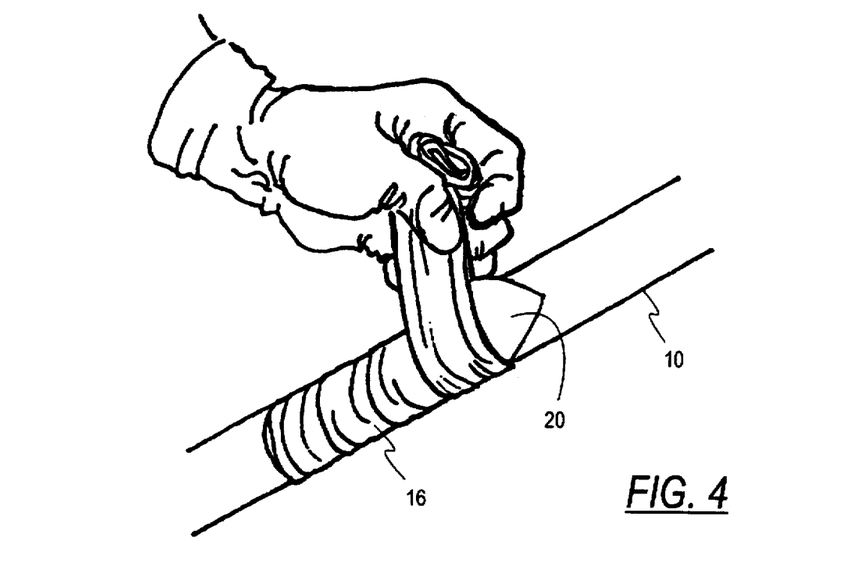
FIG. 4 illustrates a second component of the system being wrapped around the pipe over the patch shown in FIG. 3.

In situations where pressure in the pipe 10 can be reduced, the first component applied over the leak, may be in the form of a butyl patch 20 coated on one side with an adhesive. The patch 20 is placed over the hole (not shown) and pressure is applied to make the patch 20 adhere to the pipe. The patch 20 seals the leak, and the second component 16 is preferably applied over the patch 20 without delay to form a substantially rigid cover over the patch. The step of wrapping the second component 16 around the pipe 10 and over the patch 20 is illustrated in FIG. 4. The second component 16 should be wrapped over a distance extending about two inches to either side of the patch 20. "SYNTHO-GLASS" is the preferred second component 16, which after being wrapped around the patch 20 will harden in the presence of moisture. Thus, if water was leaking from the pipe 10 the second component 16 may benefit from it; otherwise, moisture, such as water, is applied to the "SYNTHO-GLASS".

Figure 5:
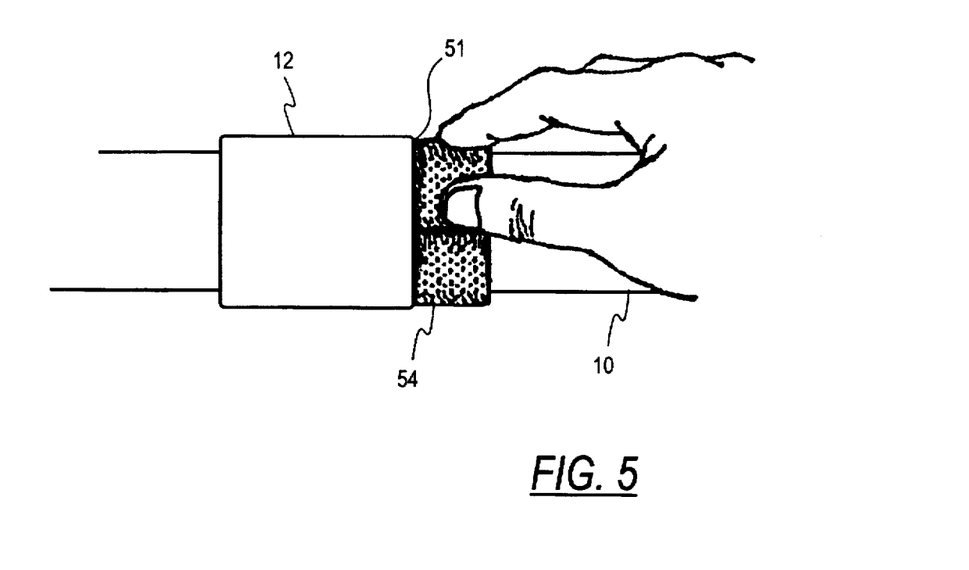
FIG. 5 illustrates a pipe joint to which a first component has been applied to reduce or stop a leak at the right-hand end of the joint.
Figure 6:
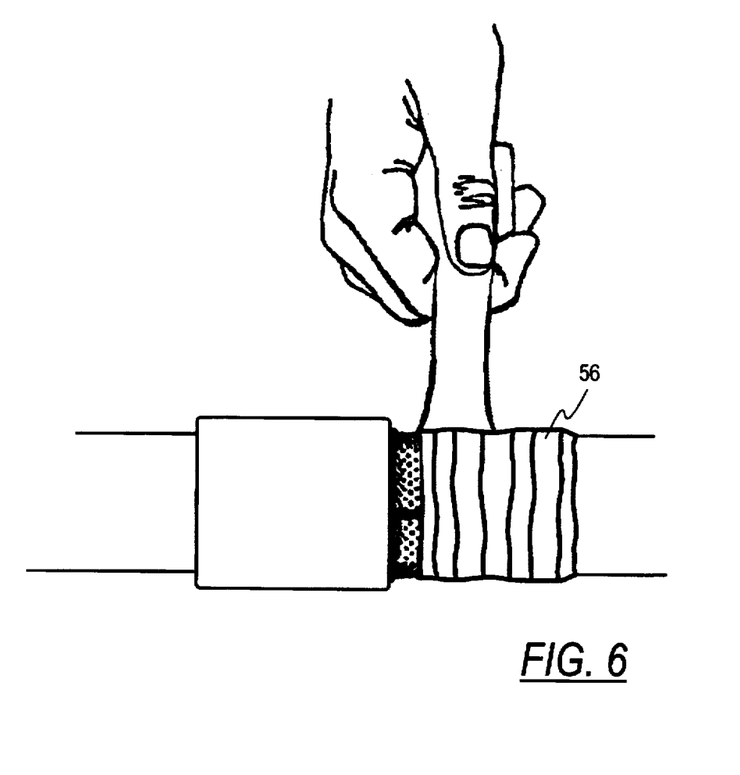
FIG. 6 illustrates the pipe joint of FIG. 5 after the partial application of a second component.
Figure 7:
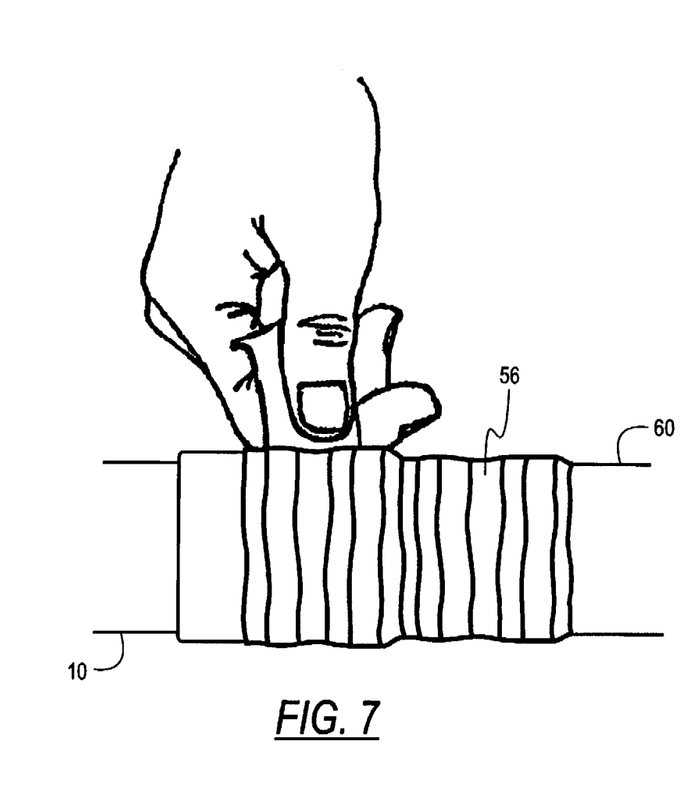
FIG. 7 illustrates the pipe joint of FIG. 5 upon completion of the application of the second component.
Figure 8:
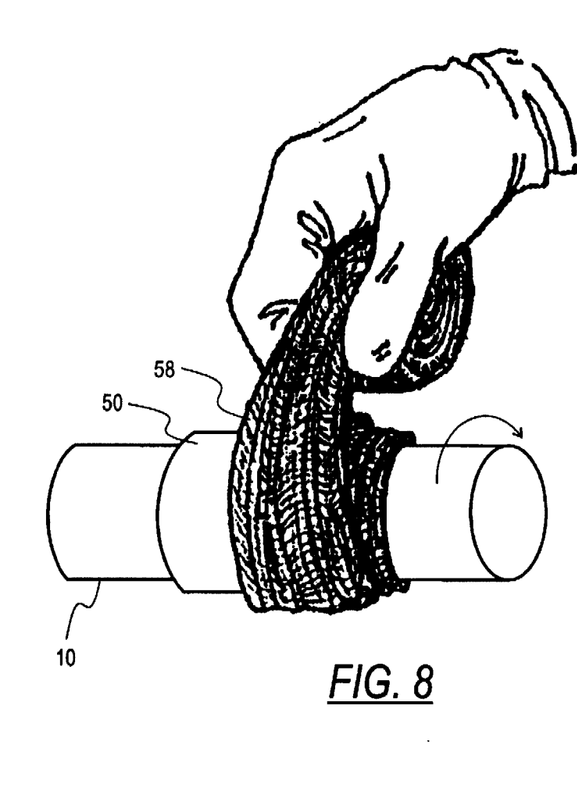
FIG. 8 illustrates the pipe joint of FIG. 5 after the partial application of a third component.

In FIGS. 5-8 a pipe joint 50 carrying a pressurized liquid has sprung a leak at one end 51 through which liquid (not shown) is escaping. FIG. 5 shows the first step of this method of the invention, in which a butyl rubber strip coated with adhesive is wrapped around the pipe 10 such that it butts the leaking end 51 of the pipe joint 50 to stop the pressurized liquid from escaping from the pipe joint 50. The butyl rubber strip 54 may be about 1.5 inches wide and 1/16 inch thick, and long enough to wrap completely around the pipe 10. As illustrated in FIGS. 6 and 7, a second component 56 in the form of a band of high tensile strength rubber is wrapped over the first component 54 with minimum delay. This band 56 may be about 1.5 inches wide and 1/16 inch thick, and long enough to start wrapping approximately two inches from one side of the butyl rubber strip 54 and wrap in one direction to the same distance on the other side of the butyl rubber strip 54, and back again, to form two or more tight layers sufficient to seal the pipe joint 50. The band 56 should be wrapped quickly and tightly stretched with sufficient overlap to form a seal. It is preferred to select a length of band 56 such that the entire length will be used to wrap the pipe 10, so that when the second component has been wrapped to seal the pipe joint 50, a third component 58 (FIG. 8) can be applied over it with minimum delay. The third step in the method preferably follows without delay in order to form a substantially rigid cover fitted tightly over the second component 56, as illustrated in FIG. 8. This provides mechanical protection for the band 56 and prevents the band 56 from unwinding. It is preferred to use as the third component 58 the "SYNTHO-GLASS" which, after being wrapped around the second component 56, hardens in the presence of moisture. Thus, if water was leaking from the pipe joint 50 the third component may benefit from it; otherwise moisture is applied to the "SYNTHO-GLASS".

Figure 9:
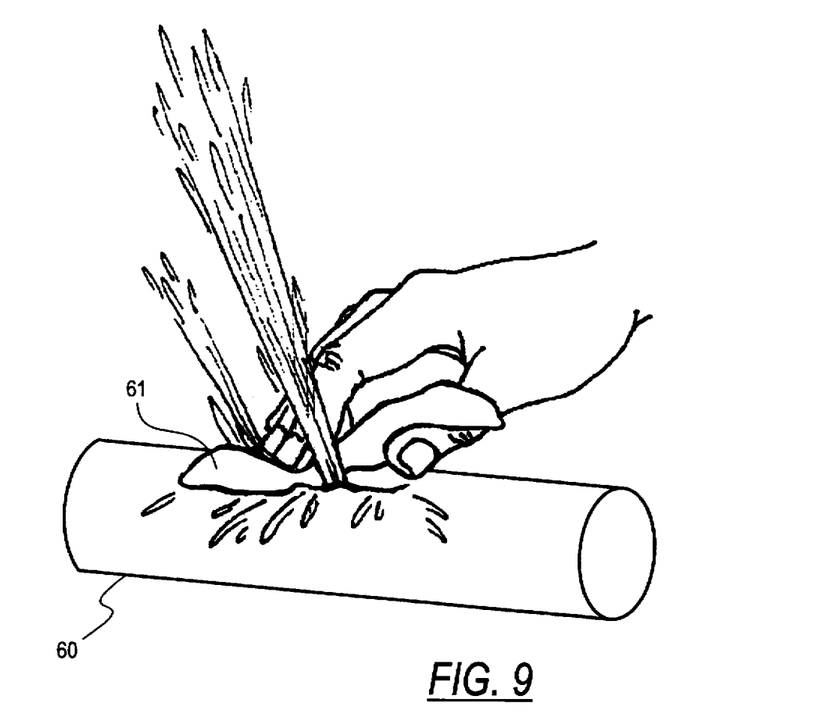
FIG. 9 illustrates a leaking cracked pipe carrying a liquid under pressure to which a first component in form of a strip is being applied.
Figure 10:
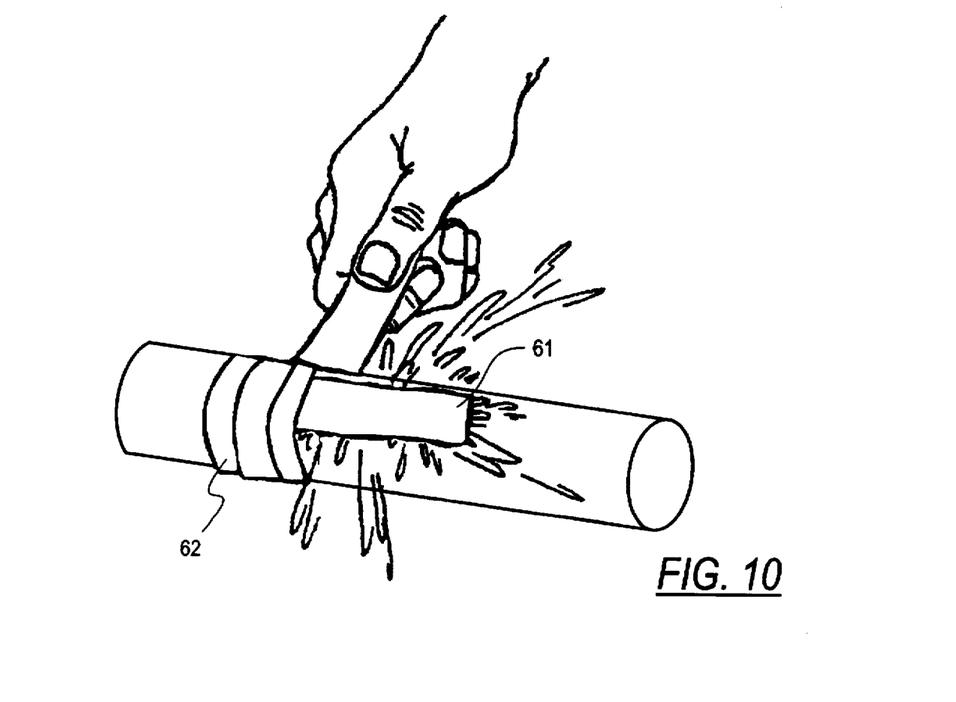
FIG. 10 illustrates a second component being wrapped around the pipe over the strip shown in FIG. 9.

FIGS. 9-12 illustrate another modified embodiment of the invention for repairing an elongated crack in a pipe 60 carrying water or other liquid under pressure. The first step, illustrated in FIG. 9, is the application of a butyl rubber strip 61 over the crack, beginning at one end of the crack and progressing to the other end. The strip 61 is coated on one side with adhesive that bonds to the pipe 60. When application of the strip 61 is completed, as shown in FIG. 10, there may still be some leakage around the strip 61, but the flow is greatly reduced.

Figure 11:
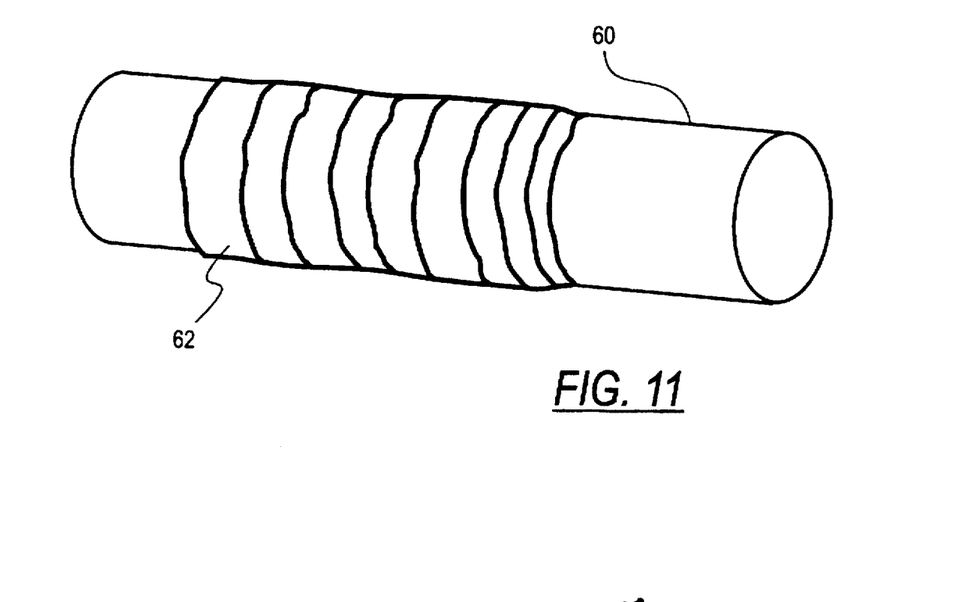
FIG. 11 illustrates the completion of the wrapping of the second component around the pipe and over the first component.

The second step is the wrapping of an elastic band 62 of high-tensile-strength rubber around the pipe 60 and over the butyl rubber strip 61, as illustrated in FIGS. 10 and 11. The wrapping of this elastic band 62 preferably begins an inch or two beyond one end of the strip 61 and continues an inch or two beyond the other end of the strip 61. About a six-inch length of adhesive-coated rubber or plastic tape is attached to each end of the band 62 to hold the band securely in place on the pipe. The elastic band 62 is stretched as it is wound around the pipe 60 so as to urge the butyl rubber strip 61 firmly against the pipe and partially into the crack in the pipe, thereby completely terminating any leakage from the pipe via the crack. The tape on one end of the band 62 is attached to the surface of the pipe 60 at the beginning of the wrapping operation to anchor the band to the pipe, and the tape at the other end of the band is attached to the pipe at the end of the wrapping operation to hold the band in its stretched and wrapped condition on the pipe surface.

Figure 12:
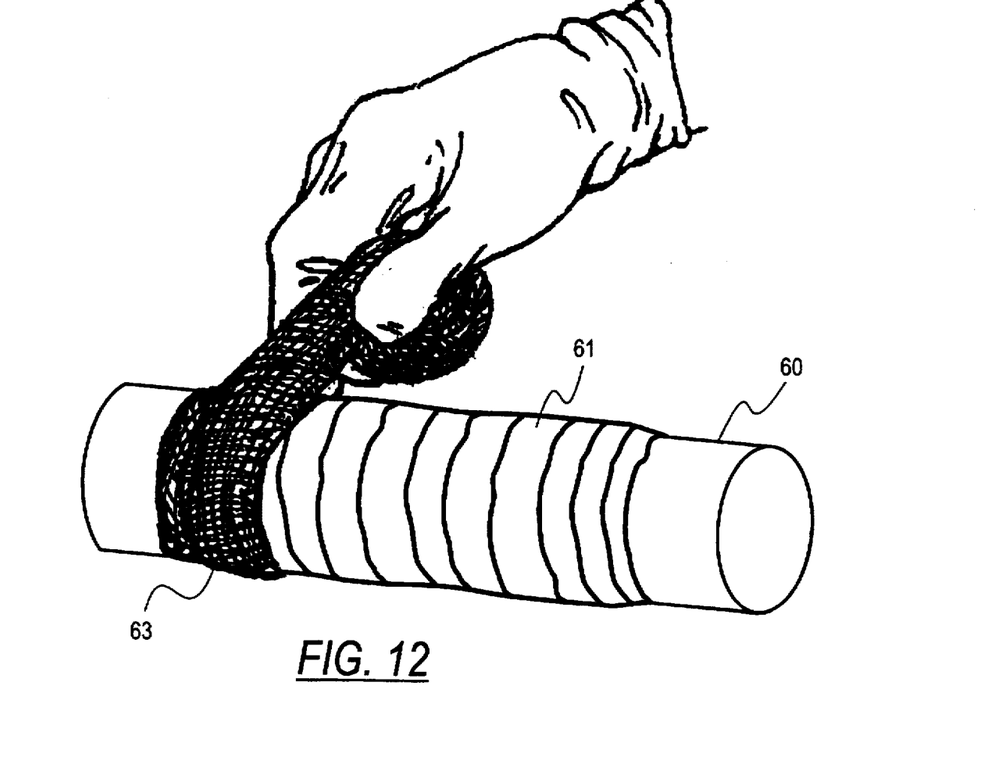
FIG. 12 illustrates a third component of the system being wrapped around the second component, to form a cooperative combination of the three components of the system.

The third and final step is the application of a protective cover layer 63 of "SYNTHO-GLASS", as shown in FIG. 12. A band of this protective covering material is wrapped over the full length of the wrapped band 62, and slightly beyond both ends of the band 62 As described above, the "SYNTHO-GLASS" is wetted prior to application, and then hardens after application and drying.

I claim:

1. A method of repairing a leak in a pipe carrying liquid not under pressure comprising the steps of:

applying a butyl rubber patch coated on one side with an adhesive over said leak and applying pressure to make the patch adhere to the pipe to stop said liquid from escaping from said pipe; and wrapping a fabric material impregnated with a resinous pliable mastic over said butyl rubber patch in such a manner as to extend over a distance to either side of said patch to bind said patch to said pipe, said fabric material having the property that while in its pliable condition it readily adheres to surfaces of articles and the further property that upon exposure to moisture it hardens spontaneously, said fabric material being exposed to moisture upon said wrapping to form a strong cover sealing, strengthening, and protecting said pipe.

2. A method of repairing a pipe carrying a liquid under pressure and having a leak, comprising the steps of:

supplying a first component comprising a length of an elastic band of high-tensile-strength rubber having two ends and having a length of adhesive-coated tape attached to each end thereof and a second component comprising a fabric material impregnated with a resinous pliable mastic having the property that while in its pliable condition it readily adheres to surfaces of articles, and the further property that upon exposure to moisture it hardens spontaneously;

attaching the tape at one end of said elastic band to said pipe;

wrapping said elastic band around said pipe while stretching said band to firmly engage the pipe surface to stop said liquid from escaping from said pipe;

attaching the tape on the other end of said elastic band to said pipe to hold said band in its stretched and wrapped condition around the pipe; and wrapping said fabric material over said band in such a manner as to extend over a distance to either side of said elastic band to bind said band to said pipe, said fabric material being exposed to moisture to form a strong cover sealing, strengthening, and protecting said pipe.

3. A method of repairing or maintaining a pipe joint having a leak of liquid, comprising the steps of:

supplying a first component comprising a butyl rubber strip coated with adhesive and of sufficient length to wrap completely around said pipe, a second component comprising a band of high-tensile-strength rubber, and a third component comprising a fabric material impregnated with a resinous pliable mastic having the property that while in its pliable condition it readily adheres to surfaces of articles, and the further property that upon exposure to moisture it hardens spontaneously, wrapping said butyl strip completely around a leaking end of said pipe joint to stop said liquid from escaping, with minimum delay, wrapping, while tightly stretching, said band around said butyl strip and said pipe joint, said band being long enough to wrap from a point spaced to one side of said strip in one direction to a point spaced to other side of said strip and back again to form at least two tight layers to seal said pipe joint, and with minimum delay, wrapping said fabric material over said band to bind said band to said pipe joint, said fabric material being exposed to moisture to form a strong cover sealing, strengthening, and protecting said pipe joint.

4. A method of repairing an elongated crack in a pipe carrying liquid under pressure comprising the steps of:

supplying a first component comprising a butyl rubber strip coated with adhesive and of sufficient length to completely cover said crack, a second component comprising a band of high-tensile-strength rubber having a length of adhesive-coated tape attached to each end thereof, and a third component comprising a fabric material impregnated with a resinous pliable mastic having the property that while in its pliable condition it readily adheres to surfaces of articles, and the further property that upon exposure to moisture it hardens spontaneously, applying said butyl rubber strip over the crack so that the adhesive bonds to the pipe, attaching the tape at one end of said band to said pipe to one side of said crack;

wrapping, while tightly stretching, said band around said butyl strip and said pipe, said band being long enough to wrap from a point spaced to one side of said strip to a point spaced to other side of said strip, attaching the tape at the other end of said band to said pipe to the other side of said crack to hold said band in its stretched and wrapped condition around the pipe, and wrapping said fabric material over said band to bind said band to said pipe joint, said fabric material being exposed to moisture to form a strong cover sealing, strengthening, and protecting said pipe joint.

5. A method of repairing an elongated crack in a pipe carrying liquid under pressure, comprising the steps of:

supplying a first component comprising a butyl rubber strip coated with adhesive and of sufficient length to completely cover said crack, a second component comprising a band of high-tensile-strength rubber, and a third component comprising a fabric material impregnated with a resinous pliable mastic having the property that while in its pliable condition it readily adheres to surfaces of articles, and the further property that upon exposure to moisture it hardens spontaneously, applying said butyl rubber strip over the crack so that the adhesive bonds to the pipe, wrapping, while tightly stretching, said band around said butyl strip and said pipe, said band being long enough to wrap from a point spaced to one side of said strip to a point spaced to other side of said strip, and wrapping said fabric material over said band to bind said band to said pipe joint, said fabric material being exposed to moisture to form a strong cover sealing, strengthening, and protecting said pipe joint.

* * * * *

UNITED STATES PATENT AND TRADEMARK OFFICE
CERTIFICATE OF CORRECTION

PATENT NO. : 5,894,864
DATED : April 20, 1999
INVENTOR(S) : Benjamin P. Rich

It is certified that error appears in the above-indentified patent and that said Letters Patent is hereby corrected as shown below:

Column 5, Claim 3, line 60, delete "or maintaining".

Signed and Sealed this

Twenty-eighth Day of September, 1999

Attest:

Q. TODD DICKINSON

*Attesting Officer*  *Acting Commissioner of Patents and Trademarks*